United States Patent Office 2,832,768
Patented Apr. 29, 1958

2,832,768

PREPARATION OF ALPHA-BROMO-EPSILON-CAPROLACTAM FROM CYCLOHEXANONE OXIME

William C. Francis, Pittsburg, Kans., and Thomas R. Hopkins, Joplin, Mo., assignors to Spencer Chemical Company, a corporation of Missouri No Drawing. Application March 30, 1956
Serial No. 574,966

6 Claims. (Cl. 260—239.3)

This invention relates to novel chemical compounds. More particularly, this invention is concerned with a novel process of producing a compound of the formula

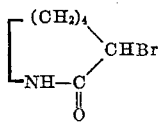

which may be named alpha-bromo-epsilon-caprolactam or 2-keto-3-bromohexamethyleneimine. This compound is a useful intermediate in a synthesis of lysine.

It has been found, according to the present invention, that alpha-bromo-epsilon-caprolactam may be conveniently produced by reacting cyclohexanone oxime with a brominating agent followed by hydrolysis of the resulting reaction product. This reaction, however, may be conveniently represented as follows:

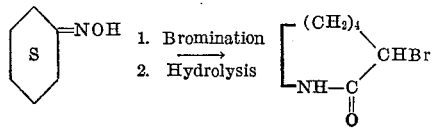

It is presumed that in this process an intermediate compound of indeterminate composition is formed first which is subsequently converted to alpha-bromo-epsilon-caprolactam.

It is surprising to find that this bromination results in a reaction product which upon hydrolysis yields substantial amounts of alpha-bromo-epsilon-caprolactam in preference to alpha, alpha - dibromo - epsilon - caprolactam since chlorination under similar conditions, followed by hydrolysis, results chiefly in the formation of alpha, alpha-dichloro-epsilon-caprolactam. The production of the monobromocaprolactam is significant since it obviates one step in the production of monohalolactams suitable for use in the synthesis of lysine. Previously, it was necessary to subject the dichlorocaprolactam to catalytic hydrogenation, or other chemical means of dehalogenation, to produce monochlorocaprolactam.

Some brominating agents which may be employed in the described process are $PBr_5$, $PBr_3$, $PCl_5$ plus $Br_2$, $PBr_3$ plus $Br_2$, $PCl_3$ plus $Br_2$ and appropriate mixtures thereof. Of these, $PBr_5$, or the equivalent combination of $PBr_3$ and $Br_2$, is the preferred brominating agent. Generally, at least two moles of a brominating agent are employed per mole of cyclohexanone oxime; however, a substanital excess may be used if desired.

The reaction is preferably effected under liquid reaction conditions. This may be achieved through the use of an excess of brominating agents which are liquids at the reaction temperatures employed or, and preferably, by the use of inert organic solvents such as xylene, benzene, toluene, chloroform and carbon tetrachloride. Liquid reaction conditions make it possible to control the heat of reaction readily, maintain the reactants in intimate contact and facilitate processing.

Reaction temperatures will vary considerably with the solvents used and the particular brominating agent employed; however, it is generally found that such reaction temperatures fall within the range of 30–120° C. The preferred temperatures are 40–50° C.; by selecting an agent and solvent which effect the reaction at such temperatures, high yields of the final products are obtained. $PBr_5$, or the equivalent combination of $PBr_3$ and $Br_2$, works very well at these temperatures. It has also been found that increased yields result from contacting cyclohexanone oxime and the brominating agent at initial temperatures below about 30° C. and subsequently raising the temperature of the mixture to effect bromination. It is accordingly advantageous to first bring the reactants together at about 10° C. to 30° C., although lower temperatures may also be used.

The time required to complete the reaction will vary, but from 1 to 5 hours is considered adequate under most conditions.

After the bromination reaction is terminated, the product is readily converted by hydrolysis to the desired alpha-bromo-epsilon-caprolactam. The brominated mixture may be hydrolyzed directly, but it is preferred to first remove the solvent medium before doing this so that the product will precipitate directly from the hydrolysis mixture. Other conventional recovery procedures may be employed as desired.

Alpha-bromo-epsilon-caprolactam may be subsequently aminated and hydrolyzed to form lysine following the novel procedures disclosed and claimed in the copending application, Serial No. 574,967, filed March 30, 1956.

The following example is presented to illustrate specific embodiments of the invention. It should be understood, however, that this example shall in no way be understood as limiting the invention to this specific procedure.

*Example 1*

17.0 grams (0.15 mole) of cyclohexanone oxime dissolved in 50 ml. of benzene was slowly added with stirring to a mixture of $Br_2$ (0.3 mole) and $PBr_3$ (0.3 mole) in 50 ml. of benzene which was maintained at 15–20° C.; after stirring at 15–20° C. for 70 minutes, the mixture was heated at 40–50° C. for 2 hours, an additional 100 ml. of benzene was added and the stirring continued at 50° C. for 1½ hours. The entire reaction was carried out under a nitrogen atmosphere. Hydrolysis of the lower oily layer with cracked ice provided 7.9 g. of crude alpha-bromo-epsilon-caprolactam; M. P. 105–112° C. A second crop (8.3 g.) crystallized from the aqueous solution after treatment with $Na_2S_2O_5$, $Na_2CO_3$ and the amount of NaCl required to saturate the solution. Recrystallization of the combined crops from ligroin yielded 12.3 g. which melted at 112–114° C.

Various changes and modifications of the invention can be made and, to the extent that such variations incorporate the spirit of this invention, they are intended to be included within the scope of the appended claims.

What is claimed is:

1. The process which comprises reacting cyclohexanone oxime with a brominating agent and hydrolyzing the resulting product to produce alpha-bromo-epsilon-caprolactam.

2. The process which comprises preparing a mixture of cyclohexanone oxime, a brominating agent and a liquid reaction medium below the bromination temperature of the mixture, heating the mixture to the bromination temperature, maintaining such temperature until the bromination is terminated, and hydrolyzing the resulting product to form alpha-bromo-epsilon-caprolactam.

3. The process of claim 2 in which the mixture is prepared below 30° C. and the bromination reaction is effected above 30° C.

4. The process which comprises reacting cyclohexanone oxime with a brominating agent in a liquid reaction medium at a temperature above 30° C. and hydrolyzing the resulting product to produce alpha-bromo-epsilon-caprolactam.

5. The process of claim 4 in which the bromination temperature is 30–120° C.

6. The process which comprises preparing a mixture of cyclohexanone oxime, a brominating agent and a liquid reaction medium at a temperature from 10–30° C., raising the temperature to a brominating temperature of 40–50° C., mainatining such a temperature until the reaction is terminated, and hydrolyzing the resulting product to form alpha-bromo-epsilon-caprolactam.

References Cited in the file of this patent

FOREIGN PATENTS 748,542     Germany _____ Apr. 13, 1944